United States Patent
Kim et al.

(10) Patent No.: US 12,319,860 B2
(45) Date of Patent: Jun. 3, 2025

(54) ETCHANT COMPOSITION FOR INDIUM OXIDE FILM OR SILVER-CONTAINING METAL FILM AND METHOD FOR PREPARING THE SAME

(71) Applicants: Samsung Display Co., Ltd., Yongin-Si (KR); ENF TECHNOLOGY CO., LTD., Yongin-si (KR)

(72) Inventors: Hyoungsik Kim, Yongin-si (KR); Jonghee Park, Yongin-si (KR); Sehoon Kim, Yongin-si (KR); Boyeon Lee, Yongin-si (KR); Yangryeong Kim, Yongin-si (KR); Seokil Jung, Yongin-si (KR); Ikjoon Kim, Yongin-si (KR); Sangseung Park, Yongin-si (KR); Wonho Noh, Yongin-si (KR); Mingyeong Jeong, Yongin-si (KR)

(73) Assignees: Samsung Display Co., Ltd., Yongin-si (KR); ENF TECHNOLOGY CO., LTD., Yongin-si (KR)

( * ) Notice: Subject to any disclaimer, the term of this patent is extended or adjusted under 35 U.S.C. 154(b) by 245 days.

(21) Appl. No.: 17/994,173

(22) Filed: Nov. 25, 2022

(65) Prior Publication Data

US 2023/0167360 A1   Jun. 1, 2023

(30) Foreign Application Priority Data

Nov. 26, 2021   (KR) ......................... 10-2021-0166194

(51) Int. Cl.
  *C09K 13/06*   (2006.01)
  *C23F 1/16*    (2006.01)
  *C23F 1/30*    (2006.01)

(52) U.S. Cl.
  CPC ............... *C09K 13/06* (2013.01); *C23F 1/16* (2013.01); *C23F 1/30* (2013.01)

(58) Field of Classification Search
  None
  See application file for complete search history.

(56) References Cited

U.S. PATENT DOCUMENTS

| | | | |
|---|---|---|---|
| 10,372,140 B2 | 8/2019 | Sun et al. | |
| 10,903,625 B2 | 1/2021 | Hogan et al. | |
| 10,923,514 B2 | 2/2021 | Hogan et al. | |
| 11,225,721 B2 | 1/2022 | Kim et al. | |
| 2003/0168431 A1 | 9/2003 | Lee et al. | |
| 2015/0018434 A1 | 1/2015 | Cappelli | |
| 2019/0322935 A1* | 10/2019 | Park | H01L 21/32134 |
| 2019/0368053 A1 | 12/2019 | Kim et al. | |
| 2020/0115631 A1* | 4/2020 | Park | H01L 21/465 |
| 2020/0148951 A1* | 5/2020 | Park | C23F 1/02 |
| 2022/0204846 A1* | 6/2022 | Park | C23F 1/30 |

FOREIGN PATENT DOCUMENTS

| | | | | |
|---|---|---|---|---|
| CN | 101070596 A | * | 11/2007 | ............ C07C 51/42 |
| JP | 2020-107870 A | | 7/2020 | |
| KR | 10-0579421 B1 | | 5/2006 | |
| KR | 10-0993775 B1 | | 11/2010 | |
| KR | 10-1518055 B1 | | 5/2015 | |
| KR | 10-1926279 B1 | | 12/2018 | |
| KR | 10-2019-0137193 A | | 12/2019 | |
| KR | 10-2160288 B1 | | 9/2020 | |
| KR | 10-2223681 B1 | | 3/2021 | |
| WO | 2015-134456 A1 | | 9/2015 | |

* cited by examiner

*Primary Examiner* — Allan W. Olsen
(74) *Attorney, Agent, or Firm* — Innovation Counsel LLP

(57) ABSTRACT

An etchant composition is disclosed that provides selective etching of an indium oxide film or a sliver-containing metal layer. The etchant composition includes nitric acid, an organic acid, a sulfur compound, and a tin compound. The organic acid does not include the elements of sulfur and tin. The sulfur compound does not include the element of tin. The etchant composition may minimize the damage of a lower metal film and may exhibit excellent etching characteristics in terms of etching rate, bias, residue, precipitation, and etching uniformity.

8 Claims, No Drawings

ETCHANT COMPOSITION FOR INDIUM OXIDE FILM OR SILVER-CONTAINING METAL FILM AND METHOD FOR PREPARING THE SAME

CROSS-REFERENCE TO RELATED APPLICATION

This application is based on and claims priority under 35 U.S.C. § 119 to Korean Patent Application No. 10-2021-0166194, filed on Nov. 26, 2021, in the Korean Intellectual Property Office, the disclosure of which is incorporated by reference herein in its entirety.

BACKGROUND

1. Field

The present disclosure relates to an etchant composition for selectively etching an indium oxide film or a sliver-containing metal film, and a method of preparing the etchant composition.

2. Description of the Related Art

A display reflector reduces the loss of light by reflecting light from the rear toward the front. A thin film that includes silver (Ag) having high reflectivity reflects light from the rear to the front with higher efficiency than that of a reflector treated with white paint or an aluminum reflector, and thus may allow illuminance to be nearly doubled. Accordingly, silver-containing metal films with low light loss and having low resistivity and high luminance compared to other metals have been used as reflectors. In addition, in accordance with the high resolution and enlargement of a display device, wiring containing silver having higher conductivity than aluminum and copper, which are generally used in wirings of a thin-film transistor substrate, is used.

However, in a case of using an etchant of the related art that includes nitric acid, phosphoric acid, sulfuric acid, or acetic acid, a short circuit may occur in some wirings including silver, and with an increasing number of silver-containing metal films being etched, problems such as a great increase in etching deviation may arise. Etching of indium oxide films may encounter problems such as an increase in etching deviation.

There is a need for an etchant composition for a silver-containing metal film or an indium oxide film, having improvements in terms of issues such as etching uniformity, residue, or precipitation.

SUMMARY

One or more embodiments include a composition for the uniform etching and effective treatment of a silver-containing metal layer or an indium oxide layer, and a method of preparing the etchant composition.

Additional aspects will be set forth in part in the description which follows and, in part, will be apparent from the description, or may be learned by practice of the presented embodiments of the disclosure.

According to one or more embodiments, provided is an etchant composition for an indium oxide film or a silver-containing metal film, the etchant composition including: nitric acid; an organic acid; a sulfur compound; and a tin compound, wherein the organic acid does not include the elements of sulfur and tin, and the sulfur compound does not include a tin atom.

In one or more embodiments, the sulfur compound may include an organic sulfur compound and an inorganic sulfur compound.

In one or more embodiments, the organic sulfur compound includes a $C_1$-$C_{10}$ alkyl sulfonic acid having a C—S bond.

For example, the organic sulfur compound may include methane sulfonic acid, ethane sulfonic acid, propane sulfonic acid, butane sulfonic acid, pentane sulfonic acid, hexane sulfonic acid, peptane sulfonic acid, octane sulfonic acid, nonane sulfonic acid, decane sulfonic acid, or any combination thereof.

In one or more embodiments, the inorganic sulfur compound may include an alkali metal sulfur compound.

For example, the inorganic sulfur compound may include sodium sulfate, sodium hydrogen sulfate, potassium sulfate, potassium hydrogen sulfate, ammonium sulfate, ammonium hydrogen sulfate, magnesium sulfate, or any combination thereof.

In one or more embodiments, the organic acid may include acetic acid, citric acid, propionic acid, caproic acid, caprylic acid, phenylacetic acid, benzoic acid, benzene monocarboxylic acid, nitrobenzoic acid, hydroxybenzoic acid, hydroxybenzene, aminobenzoic acid, diacetic acid, lactic acid, pyruvic acid, succinic acid, glutaric acid, phthalic acid, adipic acid, pimelic acid, suberic acid, iminodiacetic acid, malic acid, tartaric acid, or any combination thereof.

In one or more embodiments, the tin compound may include tin sulfate, tin nitrate, tin acetate, tin chloride, tin fluoride, or any combination.

According to one or more embodiments, provided is a method of preparing an etchant composition for an indium oxide film or a silver-containing metal film, the method including mixing about 0.5 wt % to about 25 wt % of nitric acid, about 1 wt % to about 50 wt % of an organic acid, about 10 wt % to about 60 wt % of a sulfur compound, and about 0.001 wt % to about 5 wt % of a tin compound, wherein the organic acid does not include the elements of sulfur and tin, and the sulfur compound does not include a tin atom.

In one or more embodiments, the sulfur compound may include an organic sulfur compound and an inorganic sulfur compound.

Specific details of other embodiments are included in the following descriptions of the invention.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

The disclosure may include various modifications and various embodiments, and specific embodiments will be described in detail. However, this is not intended to limit the specific embodiments, and should be construed as including any modifications, equivalents or alternatives that belong to the spirit and technical scope of the present disclosure. In describing the present disclosure, in cases where it is considered that detailed descriptions of known related technologies may obscure the subject matter of the present disclosure, such detailed descriptions are omitted.

Unless stated otherwise in the present specification, the expression "to" used in numerical expressions is used as meaning that the upper and lower limits are included. For example, the numerical expression of "1 to 2" is meant to include all numerical values between 1 and 2, as well as 1 and 2.

During an etching process of a semiconductor substrate, damage may occur to a lower metal film, which may include copper, aluminum, or the like. One or more embodiments are to provide an etchant composition which minimizes the damage of the lower metal film regardless of the type of the lower metal film, and which may improve etching characteristics of an indium oxide film and a silver-containing metal film, which are upper layers.

Hereinafter, an etchant composition for an indium oxide film or a silver-containing metal film, according to embodiments of the present disclosure, and a method of preparing the same will be described in greater detail.

According to one or more embodiments, provided is an etchant composition for an indium oxide film or a silver-containing metal film, the etchant composition including: nitric acid; an organic acid; a sulfur compound; and a tin compound, wherein the organic acid does not include the elements of sulfur and tin, and the sulfur compound does not include the element of tin.

In one or more embodiments, the nitric acid may function as a main oxidizing agent, and the amount of the nitric acid may be about 0.5 wt % to about 25 wt %, for example, about 1 wt % to about 15 wt %, for example, about 5 wt % to about 10 wt %.

In one or more embodiments, the organic acid may be a buffer solution and function as a chelate. The organic acid does not include the elements of sulfur and tin. For example, the organic acid may include acetic acid, citric acid, propionic acid, caproic acid, caprylic acid, phenylacetic acid, benzoic acid, benzene monocarboxylic acid, nitrobenzoic acid, hydroxybenzoic acid, hydroxybenzene, aminobenzoic acid, diacetic acid, lactic acid, pyruvic acid, succinic acid, glutaric acid, phthalic acid, adipic acid, pimelic acid, suberic acid, iminodiacetic acid, malic acid, tartaric acid, or any combination thereof. For example, the organic acid may include acetic acid or citric acid. For example, the organic acid may include acetic acid and citric acid. A total amount of the organic acid may be about 1 wt % to about 50 wt %, for example, about 10 wt % to about 50 wt %, for example, about 20 wt % to about 45 wt %.

In one or more embodiments, the sulfur compound may be involved in etching metal, and the sulfur compound may include an organic sulfur compound and an inorganic sulfur compound.

The organic sulfur compound may adjust the acidity of the etchant composition, and may etch silver. For example, the organic sulfur compound may include a $C_1$-$C_{10}$ alkyl sulfonic acid having a C—S bond. For example, the organic sulfur compound may include methane sulfonic acid, ethane sulfonic acid, propane sulfonic acid, butane sulfonic acid, pentane sulfonic acid, hexane sulfonic acid, peptane sulfonic acid, octane sulfonic acid, nonane sulfonic acid, decane sulfonic acid, or any combination thereof. An amount of the organic sulfur compound may be about 1 wt % to about 10 wt %, for example, about 3 wt % to about 8 wt %.

In addition, the inorganic sulfur compound may etch an indium tin oxide (ITO). The inorganic sulfur compound may include, for example, an alkali metal sulfur compound. For example, the inorganic sulfur compound may include sodium sulfate, sodium hydrogen sulfate, potassium sulfate, potassium hydrogen sulfate, ammonium sulfate, ammonium hydrogen sulfate, magnesium sulfate, or any combination thereof. For example, the inorganic sulfur compound does not include sulfuric acid.

An amount of the inorganic sulfur compound is about 9 wt % to about 50 wt %, for example, about 25 wt % to about 45 wt %, for example, about 10 wt % to about 30 wt %.

A total amount of the sulfur compound may be about 10 wt % to about 60 wt %, for example, about 13 wt % to about 50 wt %, for example, about 15 wt % to about 45 wt %.

In one or more embodiments, the tin compound may function as an auxiliary oxidizing agent. The tin compound induces the uniform etching of wirings while etching is in progress, and thus may act to ensure straightness. The tin compound may be in a metal or metal salt form. For example, the tin compound may include tin, tin sulfate, tin nitrate, tin acetate, tin chloride, tin fluoride, or any combination thereof. An amount of the tin compound may be about 0.001 wt % to about 5 wt %, for example, about 0.01 wt % to about 3 wt %, for example, about 0.01 wt % to about 1 wt %, for example, about 0.01 wt % to about 0.5 wt %. In particular, due to the inclusion of the tin compound, the straightness of wirings may be ensured after etching, and a uniform etch profile may be obtained.

In one or more embodiments, the etchant composition may include the balance of water such that the total weight of the etchant composition is 100 wt %. The water used herein may be, although not specifically limited to, deionized water. For example, deionized water having a resistivity of 18 MΩ/cm or greater, in which the resistivity indicates a degree of deionization of the water.

According to one or more embodiments, provided is a method of preparing the etchant composition according to any of the embodiments described above.

According to one or more embodiments, the etchant composition for an indium oxide film or a silver-containing metal film may minimize damage of a lower metal layer during an etching process of a metal alloy film, and at the same time may improve etching characteristics of the indium oxide film and the silver (Ag)-containing metal film as upper films. For example, the triple film of ITO/Ag/ITO may be uniformly etched without damage of the lower film. In addition, the formation of reductive precipitates of silver (Ag) may be prevented, and the formation of residues may be suppressed.

One or more embodiments of the present disclosure will now be described in detail with reference to the following examples, so as to enable a person skilled in the art to implement the present disclosure. However, these examples are only for illustrative purposes and are not intended to limit the scope of the one or more embodiments of the present disclosure, and may be implemented in various different forms.

EXAMPLES

Etchant compositions were prepared to have compositions as shown in Table 1 (units: wt %).

TABLE 1

| | | Example 1 | Example 2 | Example 3 | Example 4 | Example 5 | Example 6 | Example 7 | Example 8 |
|---|---|---|---|---|---|---|---|---|---|
| Nitrogen compound | Nitric acid | 9.9 | 9.9 | 9.9 | 9.9 | 9.9 | 9.9 | 9.9 | 9.9 |
| Sulfur compound | MSA | 4.9 | 4.9 | 4.9 | 4.9 | 4.9 | 4.9 | 4.9 | 4.9 |
| | AHS | 20 | 15 | 25 | 30 | 10 | 15 | 15 | 20 |
| Organic acid | AA | 5 | 5 | 8 | 5 | 5 | 9 | 5 | 5 |
| | CA | 35 | 20 | 25 | 25 | 20 | 30 | 20 | 20 |
| Tin compound | $SnSO_4$ | 0.05 | | | 0.03 | 0.05 | 0.1 | | 0.05 |
| | $Sn(NO_3)_4$ | | 0.05 | | 0.1 | | 0.02 | | |
| | $Sn(OOCCH_3)_2$ | | | 0.1 | | 0.1 | | 0.05 | |
| Water | | balance | balance | balance | balance | balance | balance | balance | balance |

AHS: ammonium bisulfate
MSA: methanesulfonic acid
AA: acetic acid
CA: citric acid

Comparative Example

Etchant compositions were prepared to have a composition as shown in Table 2 (units: wt %).

TABLE 2

| | | Comparative Example 1 | Comparative Example 2 | Comparative Example 3 | Comparative Example 4 |
|---|---|---|---|---|---|
| Nitrogen compound | Nitric acid | 9.9 | 9.9 | 9.9 | 9.9 |
| Sulfur compound | MSA | 4.9 | 4.9 | 4.9 | 4.9 |
| | AHS | 20 | 10 | 15 | 30 |
| Organic acid | AA | 5 | 8 | 5 | 5 |
| | CA | 20 | 20 | 20 | 20 |
| Metal salt | $Fe(NO_3)_3$ | | 0.05 | | 0.05 |
| | $Cu(NO_3)_2$ | | | 0.1 | 0.05 |
| Water | | balance | balance | balance | balance |

MSA: methanesulfonic acid
AHS: ammonium bisulfate
AA: acetic acid
CA: citric acid

Experiment Example 1: Etching Rate Evaluation

To evaluate etching rates of the etchant compositions of the examples and comparative examples, after formation of a triple film of indium tin oxide (ITO)/silver (Ag)/ITO, as a sample, on a substrate, photoresist patterning was performed on the triple film. Etching was performed on the substrate with each of the etchant compositions.

After filling a wet etcher with 10 kg of each of the etchant compositions, an etching rate for the prepared sample at a temperature set to 40° C. was evaluated.

The etching rate was evaluated based on the time when etching of a region that did not undergo photoresist patterning, among the entire area of the triple film sample, was finished, and the results are shown in Table 3.

<Etching Rate Evaluation Criteria>
⊚: less than 30 seconds
○: greater than 30 seconds and less than 40 seconds
Δ: greater than 40 seconds and less than 50 seconds
X: greater than 50 seconds

Experiment Example 2: Bias Evaluation

After filling a wet etcher with 10 kg of each of the etchant compositions, the prepared sample was etched at a temperature set to 40° C. The etched sample was rinsed with ultrapure water for about 60 seconds and then dried with nitrogen at a pressure of 3.0 kgf/cm$^2$.

The distance from the end of the photoresist to the silver-containing metal film of the triple film sample was measured using a scanning electron microscope (SEM, Model name: SU-8010, HITACHI), and the results are shown in Table 3.

Experiment Example 3: Residue Evaluation

Whether or not a residue was formed after etching with each of the etchant compositions of the examples and comparative examples was evaluated.

Each sample after the completion of the test according to Experiment Example 1 was observed with a scanning electron microscope to observe the area of the remaining metal film between ITO/Ag/ITO wirings.

Whether or not a residue was formed was evaluated by the following criteria, and the results are shown in Table 3.

<Residue Evaluation Criteria>
○: No residue formed
X: Residue formed

Experiment Example 4: Precipitate Evaluation

To evaluate the amount of precipitates during etching with each of the etchant compositions of the examples and comparative examples, each sample after the completion of the test according to Experiment Example 1 was observed with a scanning electron microscope.

The number of silver (Ag) particles on Ti/Al/Ti wirings was measured, and evaluated by the following criteria. The results are shown in Table 3.

<Precipitate Evaluation Criteria>
⊚: less than 5
○: greater than or equal to 5 and less than 20
Δ: greater than or equal to 20 and less than 50
X: greater than or equal to 50

Experiment Example 5: Etching Uniformity Evaluation

To evaluate the etching uniformity of each of the etchant compositions of the examples and comparative examples, each sample after the completion of the test according to Experiment Example 1 was observed to evaluate the uniformity of wirings formed.

After the etching, the upper photoresist was removed from the substrate by using a tetramethylammonium hydroxide (TMAH) solution. A pattern uniformity of the silver-containing metal film of the triple film sample was measured using a scanning electron microscope (SEM, Model name: SU-8010, HITACHI), and the results are shown in Table 3.

<Etching Uniformity Evaluation Criteria>
- ⊚: less than 0.05 μm
- ○: greater than or equal to 0.05 μm and less than 0.1 μm
- Δ: greater than or equal to 0.1 μm and less than 0.2 μm
- X: greater than or equal to 0.2 μm

TABLE 3

| | Etching rate | Bias | Residue | Precipitate | Etching uniformity | Disconnection of wiring |
|---|---|---|---|---|---|---|
| Example 1 | ⊚ | 0.25 | ○ | ⊚ | ⊚ | None |
| Example 2 | ⊚ | 0.21 | ○ | ⊚ | ⊚ | None |
| Example 3 | ○ | 0.23 | ○ | ⊚ | ⊚ | None |
| Example 4 | ⊚ | 0.2 | ○ | ⊚ | ⊚ | None |
| Example 5 | ○ | 0.21 | ○ | ⊚ | ⊚ | None |
| Example 6 | ○ | 0.26 | ○ | ⊚ | ⊚ | None |
| Example 7 | ○ | 0.24 | ○ | ⊚ | ⊚ | None |
| Example 8 | ○ | 0.25 | ○ | ⊚ | ⊚ | None |
| Comparative Example 1 | Δ | 0.2 | X | ○ | X | None |
| Comparative Example 2 | ⊚ | 0.35 | X | ○ | X | Occurred |
| Comparative Example 3 | Δ | 0.25 | X | ○ | X | Occurred |
| Comparative Example 4 | ⊚ | 0.3 | X | ○ | X | Occurred |

As shown in Table 3, the results of the examples confirm that the etchant compositions of the examples according to the present disclosure exhibit excellent etching characteristics in terms of etching rate, bias, residue, precipitate, and etching uniformity.

However, the results of the comparative examples not including a tin compound confirm lower effects in terms of residue and etching uniformity.

As described above, it was confirmed that the etchant compositions for an indium oxide film or a silver-containing metal film, according to embodiments of the present disclosure, have excellent etching characteristics.

An etchant composition for an indium oxide film or a silver-containing metal film, according to one or more embodiments of the present disclosure, may minimize damage of a lower metal layer during an etching process of a metal alloy film. At the same time, etching characteristics of the indium oxide film and the silver-containing metal layer, which are upper layers, may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An etchant composition for an indium oxide film or a silver-containing metal film, the etchant composition comprising:
   nitric acid;
   an organic acid;
   a sulfur compound; and
   a tin compound,
   wherein the organic acid does not include the elements of sulfur and tin,
   the sulfur compound does not include the element of tin, and
   the sulfur compound comprises ammonium sulfate, ammonium hydrogen sulfate, or any combination thereof.

2. The etchant composition of claim 1, wherein
   the sulfur compound further includes an organic sulfur compound.

3. The etchant composition of claim 2, wherein
   the organic sulfur compound includes a $C_1$-$C_{10}$ alkyl sulfonic acid having a C—S bond.

4. The etchant composition of claim 2, wherein
   the organic sulfur compound comprises methanesulfonic acid, ethanesulfonic acid, propanesulfonic acid, butanesulfonic acid, pentanesulfonic acid, hexanesulfonic acid, heptanesulfonic acid, octanesulfonic acid, nonanesulfonic acid, decanesulfonic acid, or any combination thereof.

5. The etchant composition of claim 1, wherein
   the sulfur compound further includes an alkali metal sulfur compound.

6. The etchant composition of claim 1, wherein
   the sulfur compound further comprises sodium sulfate, sodium hydrogen sulfate, potassium sulfate, potassium hydrogen sulfate, magnesium sulfate, or any combination thereof.

7. The etchant composition of claim 1, wherein
   the organic acid comprises acetic acid, citric acid, propionic acid, caproic acid, caprylic acid, phenylacetic acid, benzoic acid, benzene monocarboxylic acid, nitrobenzoic acid, hydroxybenzoic acid, hydroxybenzene, aminobenzoic acid, diacetic acid, lactic acid, pyruvic acid, succinic acid, glutaric acid, phthalic acid, adipic acid, pimelic acid, suberic acid, iminodiacetic acid, malic acid, tartaric acid, or any combination thereof.

8. The etchant composition of claim 1, wherein the tin compound comprises tin sulfate, tin nitrate, tin acetate, tin chloride, tin fluoride, or any combination.

* * * * *